United States Patent
Noguchi

(10) Patent No.: US 10,528,040 B2
(45) Date of Patent: Jan. 7, 2020

(54) PROGRAM OPTIMIZATION SYSTEM

(71) Applicant: FANUC CORPORATION, Yamanashi (JP)

(72) Inventor: Yoshiaki Noguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/712,190

(22) Filed: Sep. 22, 2017

(65) Prior Publication Data

US 2018/0107199 A1 Apr. 19, 2018

(30) Foreign Application Priority Data

Oct. 14, 2016 (JP) .................................. 2016-202515

(51) Int. Cl.
 *G05B 19/418* (2006.01)
(52) U.S. Cl.
 CPC .................. *G05B 19/41885* (2013.01); *G05B 2219/23448* (2013.01)
(58) Field of Classification Search
 CPC .... G05B 19/41885; G05B 2219/23448; G05B 19/4155; G06F 9/544
 See application file for complete search history.

(56) References Cited

U.S. PATENT DOCUMENTS

| | | | |
|---|---|---|---|
| 4,899,287 A | 2/1990 | Huelshoff et al. | |
| 5,212,798 A * | 5/1993 | Kanda | G11B 19/00 711/112 |
| 5,850,552 A | 12/1998 | Odani et al. | |
| 7,155,303 B2 * | 12/2006 | Sagasaki | G05B 19/4093 700/173 |
| 2005/0209712 A1 * | 9/2005 | Sagasaki | G05B 19/4093 700/28 |
| 2010/0070066 A1 * | 3/2010 | Wirsam | B65G 49/068 700/106 |
| 2012/0016514 A1 * | 1/2012 | Nakamura | G05B 19/4103 700/188 |

(Continued)

FOREIGN PATENT DOCUMENTS

| | | |
|---|---|---|
| CN | 1146577 A | 4/1997 |
| CN | 102934539 A | 2/2013 |

(Continued)

OTHER PUBLICATIONS

Decision to Grant a Patent in JP Application No. 2016-202515, dated Mar. 20, 2018, 6pp.

(Continued)

*Primary Examiner* — Charles R Kasenge
(74) *Attorney, Agent, or Firm* — Hauptman Ham, LLP

(57) ABSTRACT

A program optimization system is provided with a CNC simulator configured to sequentially read out a machining program and perform a machining simulation, a machining program storage unit configured to successively transfer the machining program to the CNC simulator, and a transfer speed control unit configured to control a transfer speed to be a predetermined lower limit value. The CNC simulator optimize the machining program when a state of buffering deficiency in which the machining program to be read out is insufficient is detected in a cutting section and create optimized machining program free from a buffering deficiency.

10 Claims, 6 Drawing Sheets

(56) References Cited

U.S. PATENT DOCUMENTS

2013/0066440 A1  3/2013  Kodama et al.
2016/0033956 A1  2/2016  Miyazaki et al.

FOREIGN PATENT DOCUMENTS

| CN | 103760830 A | 4/2014 |
|---|---|---|
| DE | 19936773 B4 | 6/2007 |
| JP | S63-105864 A | 5/1988 |
| JP | H07239707 A | 9/1995 |
| JP | 2000-163115 A | 6/2000 |
| JP | 2002-23816 A | 1/2002 |
| JP | 2016031725 A | 3/2016 |
| WO | 01/44882 A1 | 6/2001 |
| WO | 03/067345 A1 | 8/2003 |

OTHER PUBLICATIONS

Office Action in CN Application No. 201710953530.1, dated Nov. 2, 2018, 18pp.
Office Action in DE Application No. 102017123339.3, dated Apr. 2, 2019, 11pp.

\* cited by examiner

PROGRAM OPTIMIZATION SYSTEM

RELATED APPLICATIONS

The present application claims priority of Japanese Application Number 2016-202515 filed Oct. 14, 2016, the disclosure of which is hereby incorporated by reference herein in its entirety.

BACKGROUND OF THE INVENTION

Field of the Invention

The present invention relates to a program optimization system, and more particularly, to a technique for optimizing a machining program in an external computer configured to transfer the machining program to a numerical controller.

Description of the Related Art

A numerical controller (CNC) for controlling a machine tool or the like performs machining based on a machining program. The size of the machining program tends to become larger with an increase of the accuracy of workpieces.

The size of machining program for die machining, for example, frequently exceeds the capacity of an internal storage device (DRAM, etc.) of the CNC. As a method for overcoming this problem, there is a technique in which the CNC successively acquires a part of machining program from an external storage device (CF card, SD card, USB device, etc.) or an external computer (server, etc.) connected thereto for communication and the acquired machining program is buffered to the internal storage device. A continuous program operation can be implemented according to this method.

The speed of transfer of the machining program from the external storage device or the external computer to the CNC is not fixed. If the transfer of the machining program is delayed and causes a buffering deficiency, a machine tool cannot advance machining to the degree that the machining program is buffered, thus resulting in unexpected deceleration or stop. If the deceleration or stop occurs during cutting work, a problem may be caused that the machined surface is reduced in quality due to cutter marks or the like.

The qualities of objects to be machined and printed matter can be kept uniform by holding a print head or tool on standby in a position (e.g., an end portion of a machining or print range) where it can be stopped without problems to the degree that buffering is sufficiently achieved, in a machine (e.g., inkjet printer) adapted for reciprocating motion or the like. Also in the case of the CNC, the machining quality can be maintained by suspending the machining in non-cutting blocks, if any. However, machining programs are diverse and the number of consecutive cutting blocks is not limited. Therefore, the non-cutting blocks are not always conveniently present at the timing when the buffering deficiency occurs. In addition, since the capacity of the internal storage device of the CNC has an upper limit, the whole machining program that can finish the operation of cutting blocks between the non-cutting blocks cannot always be buffered. Even if the capacity of the internal storage device has no upper limit, it is necessary to suspend the operation until the completion of the buffering of the machining program, resulting in an increase in the cycle time, which is another problem.

In this regard, Japanese Patent Application Laid-Open No. 2016-31725 discloses a technique in which buffering points are specified in machining program. If the machining program is not buffered to the specified buffering points, a CNC suspends machining and waits until the completion of transfer of the machining program. Thus, the CNC can perform the machining without being affected by the transfer rate of the machining program.

According to the technique described above, however, the problem of the increase in the cycle time cannot be solved, since the operation is suspended while the machining program transfer is being awaited. If a machining program to be transferred is large (e.g., having millions of lines), the operation stop time may become too long or buffering may fail to be completed.

Moreover, Japanese Patent Application Laid-Open No. 7-239707 describes a CNC characterized in that the cutting feed speed is reduced before machining program in a buffer (equivalent to an internal storage device) is exhausted and that the occurrence of cutter marks and vibration is avoided by performing an escape operation even when the buffer is empty.

However, the above-described CNC has a problem that the machined surface quality can be reduced due to a local reduction in the cutting feed speed during the operation.

SUMMARY OF THE INVENTION

The present invention has been made to solve the above problems and its object is to provide a program optimization system capable of preventing unexpected deceleration or stop or deceleration or stop during cutting work due to a buffering deficiency during machining program transfer, thereby suppressing a reduction in the machined surface quality.

A program optimization system according to the present invention comprises a CNC simulator configured to sequentially read out a machining program and perform a machining simulation, a machining program storage unit configured to successively transfer the machining program to the CNC simulator, and a transfer speed control unit configured to control the speed of transfer between the machining program storage unit and the CNC simulator to be a predetermined lower limit value. The CNC simulator is configured to optimize the machining program when a state of buffering deficiency in which the machining program to be read out is insufficient is detected in a cutting section and create optimized machining program free from a buffering deficiency.

The CNC simulator may be configured to achieve the optimization by arranging, as a subprogram, an instruction set which repeatedly appears in the cutting section.

The CNC simulator may be configured to achieve the optimization by joining a plurality of blocks in the cutting section together.

The CNC simulator may be configured to achieve the optimization by changing a cutting feed speed in the cutting section.

The CNC simulator may be configured to specify a changed cutting feed speed by reducing a cutting feed speed in the cutting section step by step.

The program optimization system may further comprise an external computer, which comprises the CNC simulator, the machining program storage unit, and the transfer speed control unit, a numerical controller configured to sequentially read out the optimized machining program and perform a program operation, and an external storage device configured to successively transfer the optimized machining program to the numerical controller. The CNC simulator may be configured to transfer the optimized machining program to the external storage device.

The program optimization system may further comprise a numerical controller, which comprises the CNC simulator, the machining program storage unit, and the transfer speed control unit and configured to sequentially read out the optimized machining program and perform a program operation, and an external storage device configured to successively transfer the optimized machining program to the numerical controller.

The program optimization system may further comprise an external computer, which comprises the CNC simulator, the machining program storage unit, and the transfer speed control unit, and a numerical controller configured to sequentially read out the optimized machining program and perform a program operation. The CNC simulator may be configured to transfer the optimized machining program to the numerical controller.

According to the present invention, there can be provided a program optimization system capable of preventing unexpected deceleration or stop or deceleration or stop during cutting work due to a buffering deficiency during machining program transfer, thereby suppressing a reduction in the machined surface quality.

DETAILED DESCRIPTION OF THE PREFERRED EMBODIMENTS

Figure 1:
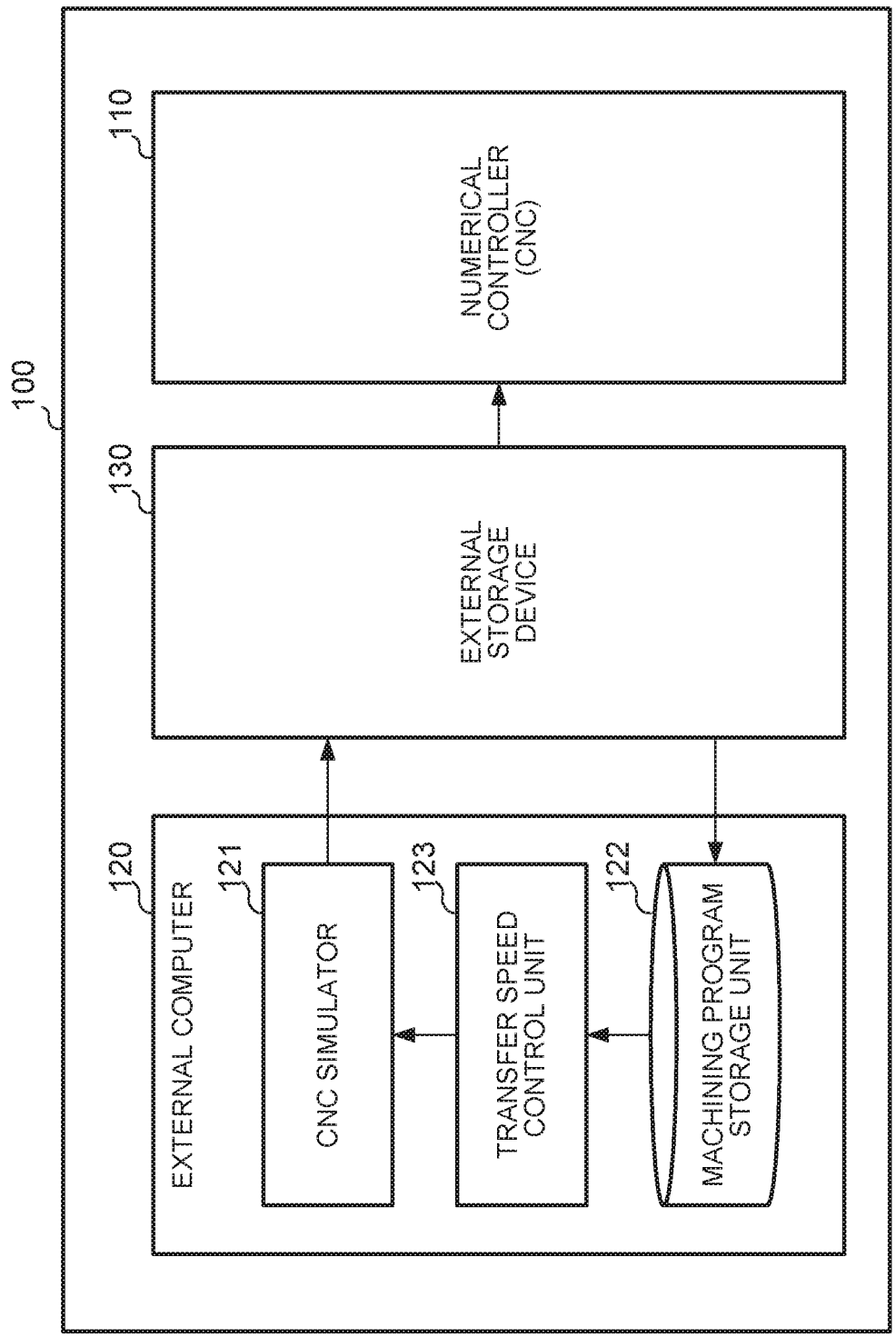
FIG. 1 is a block diagram showing the configuration of a program optimization system according to an embodiment of the present invention.

The configuration of a program optimization system 100 according to an embodiment of the present invention will be described with reference to the block diagram of FIG. 1.

The program optimization system 100 comprises a numerical controller (CNC) 110, external computer 120, and external storage device 130. Typically, the CNC 110, external computer 120, and external storage device 130 are information processors configured to logically implement various processing units (described later) as a central processing unit (CPU) performs predetermined processing according to program stored in a storage device. The CNC 110, external computer 120, and external storage device 130 are connected to one another for communication through a communication line or the like.

The CNC 110 controls a machine tool or the like (not shown) based on machining program. This is called a program operation. Moreover, the CNC 110 successively receives the machining program from the external storage device 130 and temporarily accumulates the received machining program in a built-in transfer buffer of the CNC 110. This is called buffering. Then, the CNC 110 sequentially reads out the accumulated machining program from the transfer buffer and performs the program operation. Normally, the CNC 110 deletes a part of the machining program that is used for the program operation from the transfer buffer.

The external computer 120 carries out a simulation of the buffering of the machining program and the program operation and optimization of the machining program based on the result of the simulation. The external computer 120 comprises a CNC simulator 121, machining program storage unit 122, and transfer speed control unit 123.

The machining program storage unit 122 acquires the machining program from the external storage device 130 and loads them into a predetermined storage area.

The CNC simulator 121 reads out the machining program stored in the machining program storage unit 122 through the transfer speed control unit 123 and performs the buffering and the simulation of the program operation by a conventional method. This is called a machining simulation. The CNC simulator 121 performs processing for optimizing the machining program if it is detected that the capacity of the machining program consumed by the program operation catches up with the capacity of the machining program accumulated by the buffering, at a certain point in time, as a result of the machining simulation, and therefore the state of insufficient accumulation of machining program (hereinafter referred to as buffering deficiency) occurs. Specifically, the CNC simulator 121 corrects the machining program so that the buffering deficiency does not occur and that the machining time is the shortest. Then, the CNC simulator 121 transfers the optimized machining program to the external storage device 130.

The transfer speed control unit 123 previously holds, as a machining simulation parameter, the lower limit value of the transfer speed at which the machining program is transferred from the external storage device 130 to the CNC 110, and controls the transfer speed of the machining program from the machining program storage unit 122 to the CNC simulator 121 to be reduced to the lower limit value.

The external storage device 130 is previously loaded with the machining program in the predetermined storage area and performs processing for sequentially transmitting the machining program to the CNC 110. In the present embodiment, the external storage device 130 first transmits machining program that has not been optimized yet to the external computer 120 and receives machining program that has been optimized from the external computer 120. Then, the external storage device 130 is expected to transmit the optimized machining program to the CNC 110.

Figure 2:
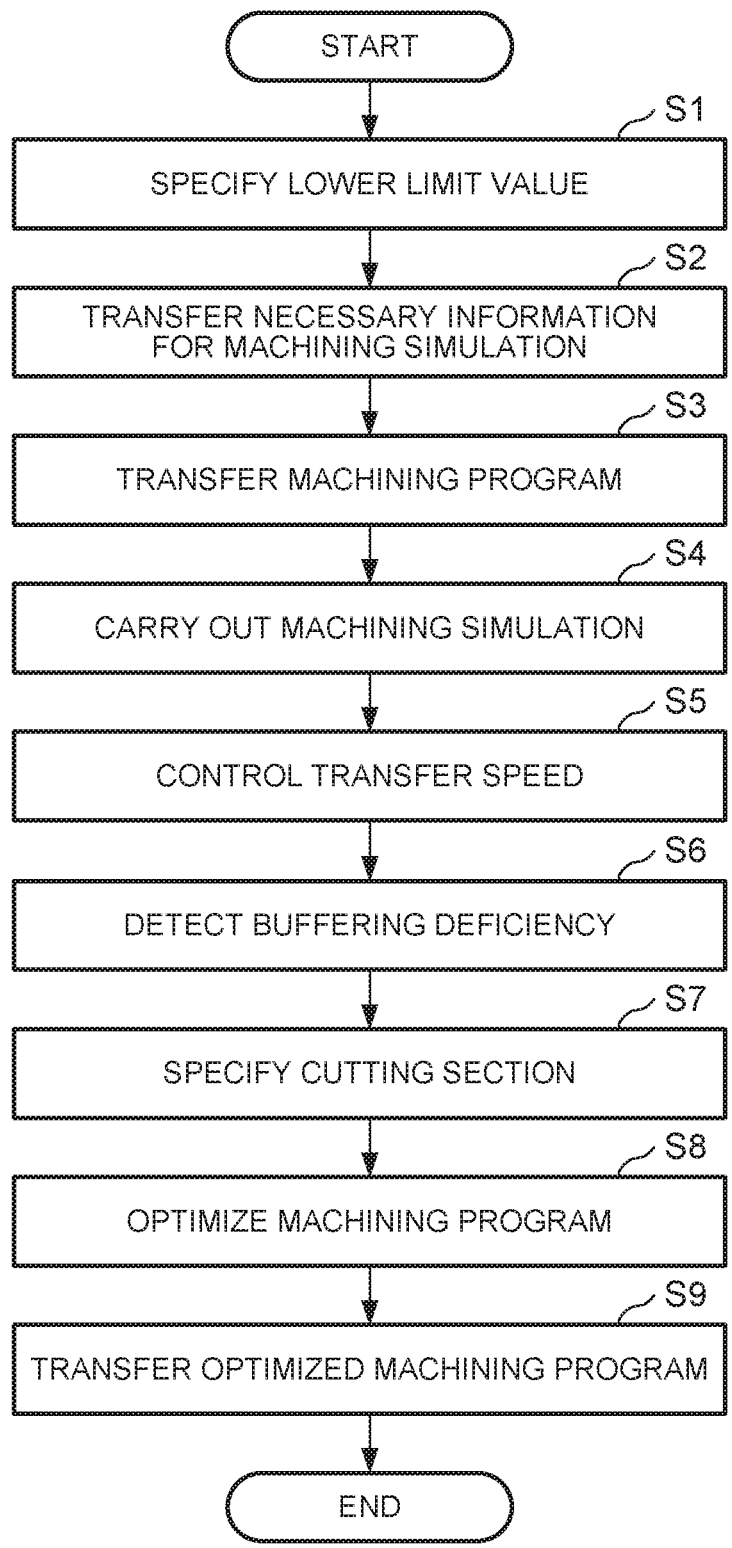
FIG. 2 is a flowchart showing the operation of the program optimization system according to the embodiment of the present invention.

The operation of the program optimization system 100 of FIG. 1 will now be described with reference to the flowchart of FIG. 2.

Figure 3:
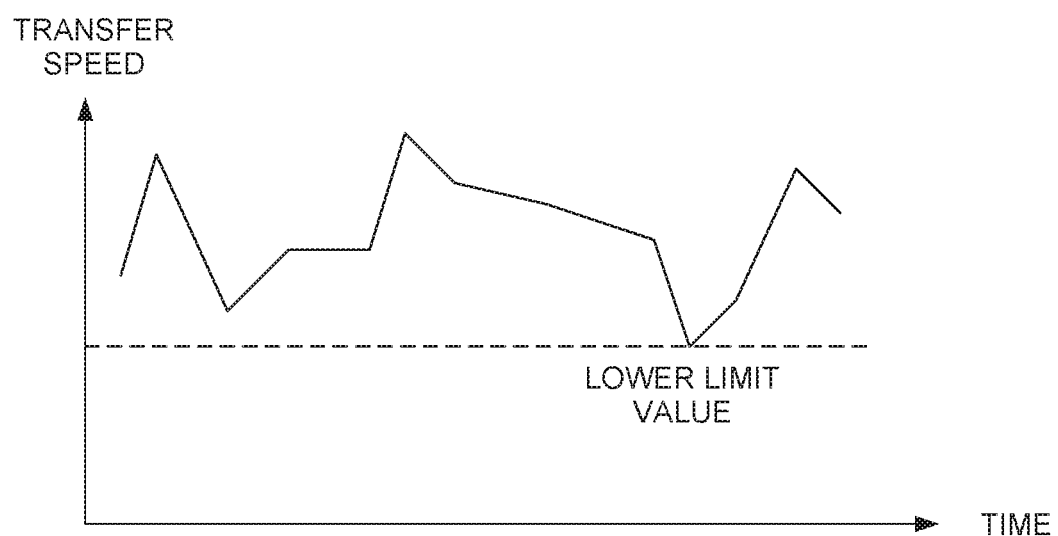
FIG. 3 is a diagram showing an example of a method for measuring the lower limit value of the transfer speed.

Step S1: The CNC 110 measures, calculates, or assumes the speed of transfer between the external storage device 130 and the CNC 110 and specifies the lower limit value of the transfer speed. The transfer speed can be measured and calculated by conventional methods. As shown in FIG. 3, for example, the speed of transfer between the external storage device 130 and the CNC 110 may be actually measured for a predetermined time so that the minimum value of the transfer speed measured within that time can be specified as the lower limit value. If actually measured values of the transfer speed are within the range from 23 Kbps to 100 Mbps, for example, the lower limit value can be specified as 23 Kbps. Moreover, by excluding exceptional ones of the measured values, the lower limit value can be obtained during somewhat stable transfer without considering a reduction in the transfer speed due to an unexpected factor.

Alternatively, the lower limit value can be specified from the internal software processing structure of the program optimization system 100. Specifically, if transfer of at least X bites at a certain time t is ensured owing to the internal processing structure of the program optimization system 100, the lower limit value r can be calculated by r=x/t.

Typically, the external storage device 130 is connected to the CNC 110 by a bus or the like that ensures a certain transfer speed. Only if the lower limit value of the transfer speed can be measured, calculated, or assumed, however, the external storage device 130 may be connected to the CNC 110. If the external storage device 130 is a server, for example, it can be connected to the CNC 110 through the network. Thus, the present embodiment is based on the premise that a value exceeding 0 can be specified as the lower limit value of the transfer speed and is not based on the assumption that the transfer speed is 0.

FIG. 3 shows an example of a method for specifying the lower limit value r of the transfer speed.

Step S2: The CNC 110 transfers the lower limit value r specified in Step S1 and various pieces of information (e.g., information on machine configuration, CNC system configuration, system parameters and others that can influence the speeds of the buffering and the program operation) required for the machining simulation to the external computer 120.

Step S3: The external storage device 130 transfers the machining program to the external computer 120. The transferred machining program is a machining program that have not been optimized yet. The machining program storage unit 122 stores the received machining program.

Step S4: The CNC simulator 121 of the external computer 120 carries out the machining simulation using the machining program stored in the machining program storage unit 122 in Step S3 and the information acquired in Step S2. The machining simulation can be carried out by a conventional method.

Step S5: The transfer speed control unit 123 performs speed control such that data transfer from the machining program storage unit 122 to the CNC simulator 121 is performed with the lower limit value specified in Step S1 at the time of the machining simulation.

Step S6: The CNC simulator 121 monitors the transfer buffer and detects the occurrence of the buffering deficiency during the machining simulation. If a cutting block is subject to the occurrence of the buffering deficiency, this cutting block is recorded.

Step S7: The CNC simulator 121 specifies non-cutting blocks before and after the cutting block recorded in Step S6.

Step S8: The CNC simulator 121 performs processing for optimizing a cutting section including the cutting block recorded in Step S6 and the non-cutting block specified in Step S7. Specifically, the CNC simulator 121 corrects the machining program in the machining program storage unit 122, thereby creating a machining program which does not cause the buffering deficiency to occur even with the lower limit value specified in Step S1 and which make the predictable machining time the shortest. The optimization processing can be implemented by the following methods.

(a) An instruction set that repeatedly appears in the cutting section is specified and the specified instruction set is arranged as a subprogram. Thus, the first subprogram transferred in the CNC 110 (CNC simulator 121) is saved so that the second and subsequent cycles of transfer need not be performed. In this way, the machining program can be reduced in transfer amount.

According to this optimization method (a), the path or speed is not changed.

(b) A plurality of blocks in the cutting section are connected to one another. For example, machining instructions for a plurality of line segments can be put together into one line segment. Specifically, the amount itself of the machining program can be reduced by approximating a polygonal or curved line, having been formed of a plurality of line segments, by a single line segment.

According to this optimization method (b), a path change generally occurs.

(c) The cutting feed speed in the cutting section is changed. The CNC simulator 121 repeatedly executes the machining simulation while changing the cutting feed speed in the cutting section step by step. If the fastest cutting speed at which the buffering deficiency ceases to occur can consequently be specified, the cutting speed in the cutting section is changed into the specified fastest cutting speed.

According to this optimization method (c), the speed changes occurs.

Step S9: The CNC simulator 121 transfers the machining program optimized in Step S8 to the external storage device 130. The external storage device 130 transfers the optimized machining program to the CNC 110. Thus, in the CNC 110, unexpected deceleration or stop or deceleration or stop during cutting work, which is attributable to the buffering deficiency during the program operation, is suppressed. Even though the deceleration is caused, the speed change is performed in the non-cutting block, so that the machining quality cannot be reduced.

Figure 4:
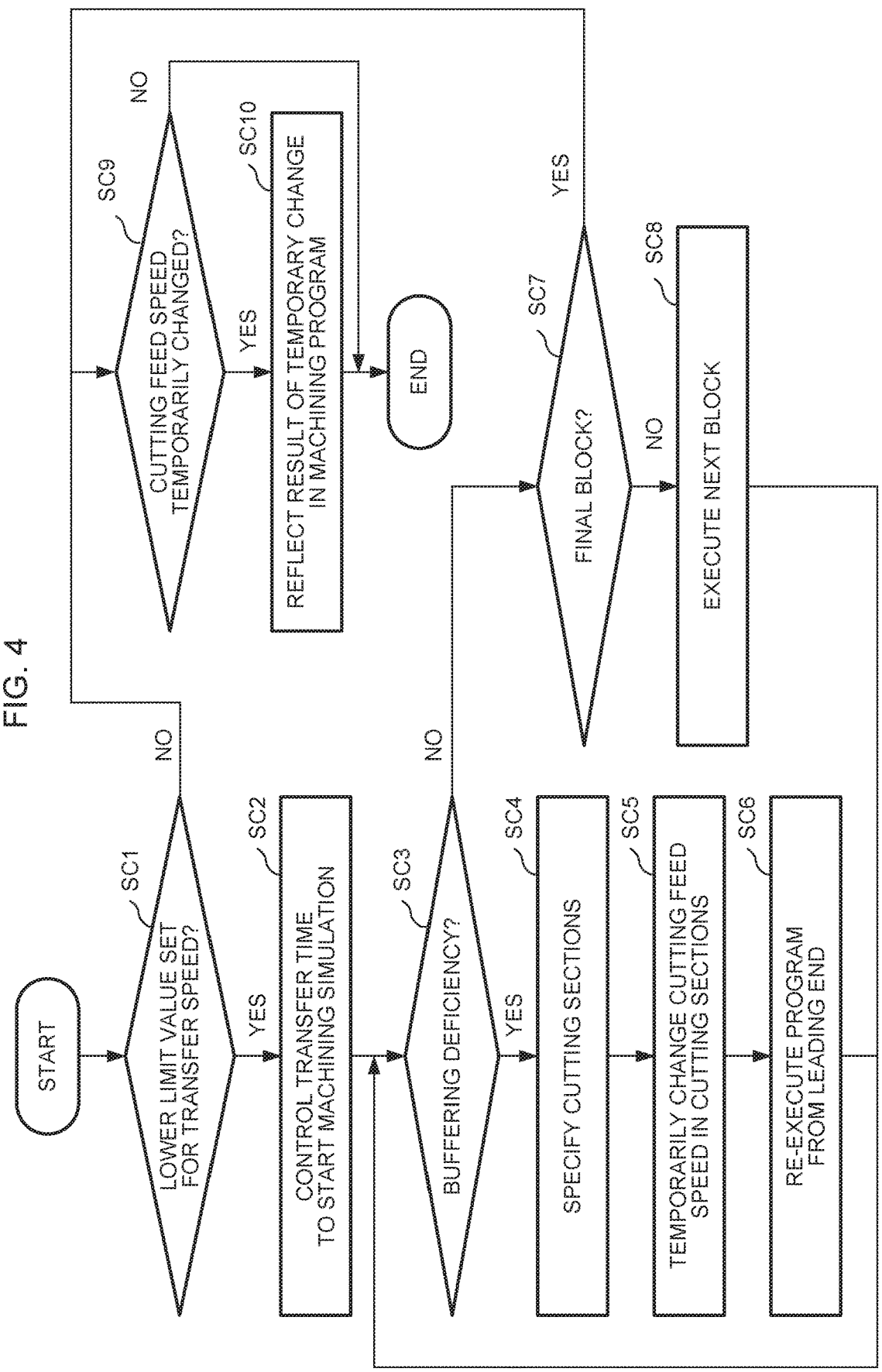
FIG. 4 is a flowchart showing the operation of the program optimization system according to the embodiment of the present invention.
Figure 5:
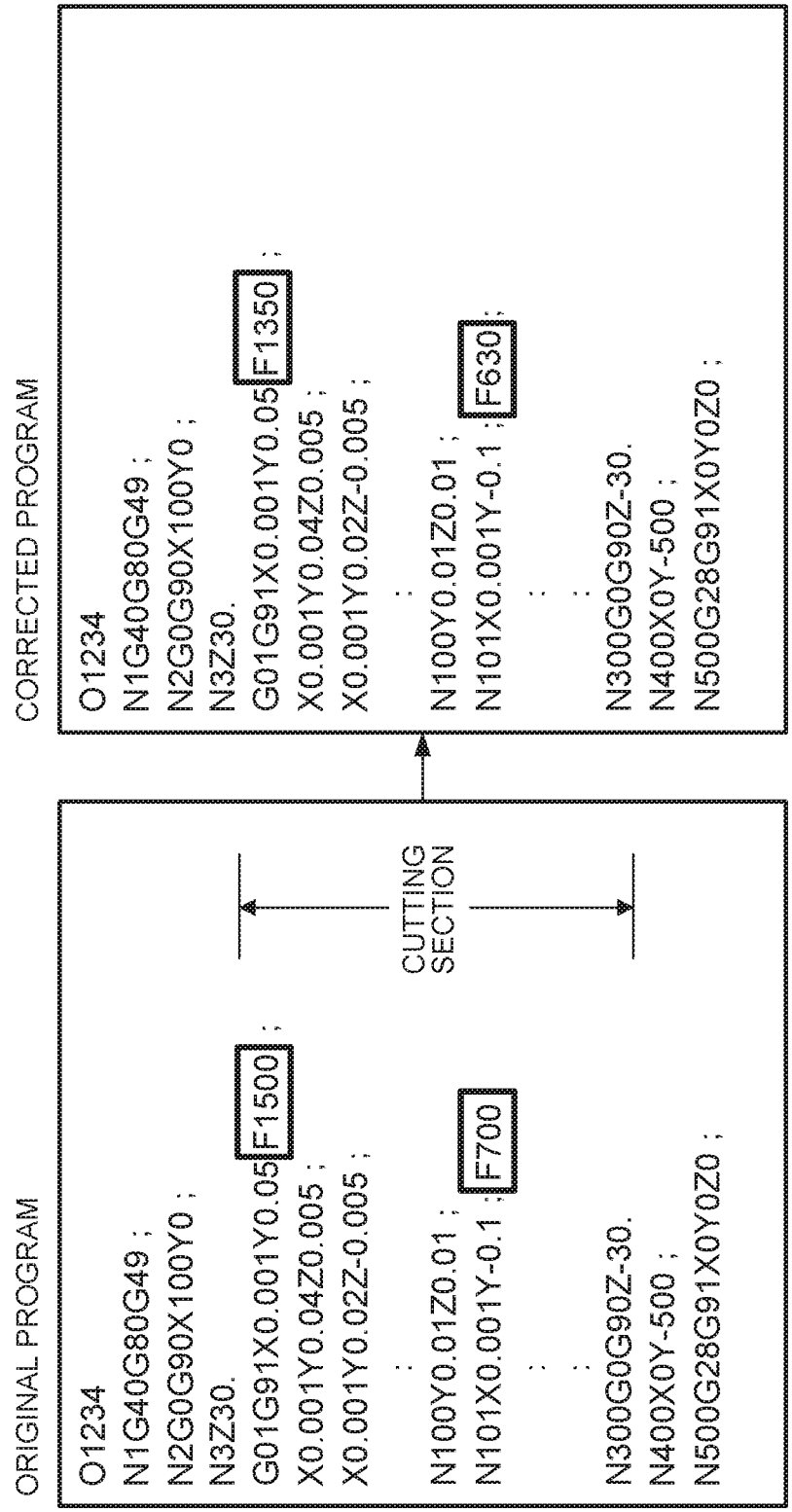
FIG. 5 is a diagram showing an example of program optimization processing.

Referring now to the flowchart of FIG. 4 and FIG. 5, the operation of the CNC simulator 121 based on the above-described optimization method (c) will further specifically be described.

Step SC1: The CNC simulator 121 checks to see if the lower limit value is set. If the lower limit value is set, the processing proceeds to Step SC2. If not, the processing proceeds to Step SC9.

Step SC2: The CNC simulator 121 starts the machining simulation with the set lower limit value for the transfer speed. The leading block of the machining program is executed.

Step SC3: The CNC simulator 121 monitors the occurrence of the buffering deficiency. If the executed block is the cutting block and if the occurrence of the buffering deficiency is detected, the processing proceeds to Step SC4. If not, the processing proceeds to Step SC7.

Step SC4: The CNC simulator 121 specifies cutting sections sandwiched between the cutting block in which the occurrence of the buffering deficiency is detected and its adjacent non-cutting blocks.

FIG. 5 shows a specific example of the cutting section. Let it be assumed that the buffering deficiency is detected in a cutting block "N100" in the original program. In this case, the cutting section sandwiched between two adjacent non-cutting blocks is specified as illustrated.

Step SC5: The CNC simulator 121 changes the cutting speed only in the cutting sections specified in Step SC4. For example, it creates a machining program in which n % (n<100) of the current cutting speed is used as a new cutting speed.

FIG. 5 shows a specific example of correction processing. In an original program, an instruction value of the cutting speed for a cutting block N101 is "F700". In a corrected program, the instruction value is changed into "F630", which is equal to 90% of the original instruction value.

Step SC6: The CNC simulator 121 re-executes the program corrected in Step SC5, starting from the leading block.

Step SC7: If the executed block is not a final block, the processing proceeds to Step SC8. If the executed block is the final block, the processing proceeds to Step SC9.

Step SC8: The next block is executed.

Step SC9: If the cutting feed speed is changed in Step SC5, the processing proceeds to Step SC10. If not, this processing ends.

Step SC10: A machining program reflective of the result of the change of the cutting feed speed in Step SC5 is created and transferred to the external storage device 130, whereupon this processing ends.

In the program optimization system 100 according to the present embodiment, the external computer 120 predicts the occurrence of the buffering deficiency in advance by carrying out the machining simulation in consideration of the lower limit value of the transfer speed. The machining program is corrected so that the buffering deficiency does not occur. Thus, unexpected deceleration or stop or deceleration or stop during the cutting work can be prevented to suppress a reduction in the machined surface quality.

Moreover, the external computer 120 specifies the fastest cutting speed at which the buffering deficiency can be eliminated. Thus, the buffering deficiency can be eliminated with the least sacrifice of the machining speed.

The present invention is not limited to the above-described embodiment and may be suitably changed without departing from the spirit of the invention. Any of the constituent elements of the embodiment may be modified or omitted without departing from the scope of the invention.

In the embodiment described above, for example, the CNC simulator 121 transfers the optimized machining program to the external storage device 130. The CNC simulator 121 may be configured to reflect the optimized machining program in the machining program storage unit 122. Thus, the external computer 120 can optimize the machining program by, for example, repeatedly using a plurality of optimization methods.

The external computer 120 can optimize the machining program by combining a plurality of optimization methods. For example, the optimization can be performed with a minimum influence on the machining if the above-described optimization methods (a) to (c) are used in the order of (a), (b) and (c) and the optimization processing is ended when the elimination of the buffering deficiency is achieved. Moreover, a machining program that is more resistant to the buffering deficiency can be obtained by using a plurality of optimization methods in an overlapping manner.

Furthermore, although the external computer 120 performs the optimization processing only if the buffering deficiency is predicted according to the embodiment described above, the present invention is not limited to this. The external computer 120 may be configured to perform the optimization processing without regard to the occurrence of the buffering deficiency. Thus, the machining program size can be reduced if the optimization methods (a) and (b) are used.

Figure 6:
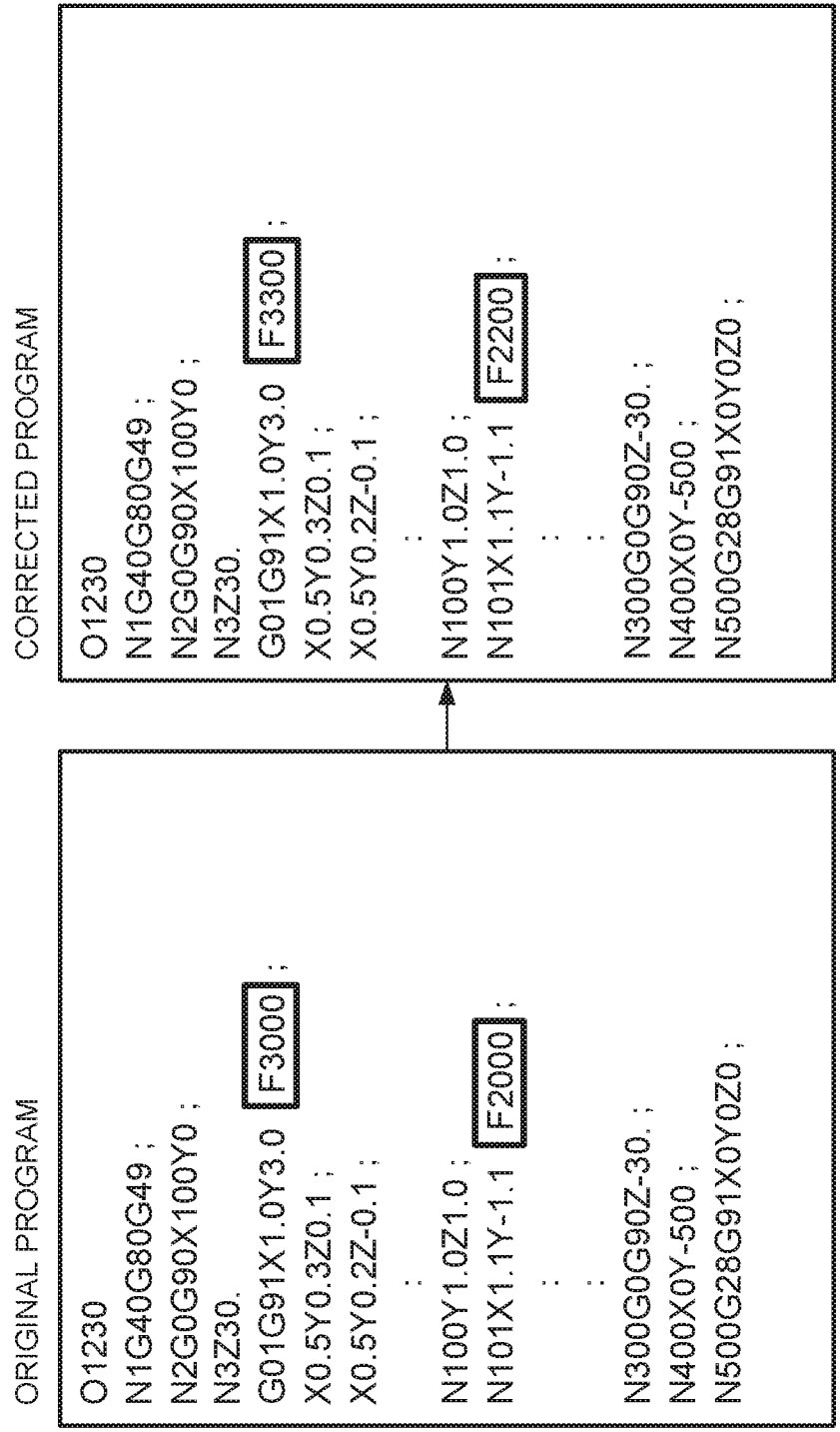
FIG. 6 is a diagram showing an example of the program optimization processing.

Moreover, when the optimization method (c) is used and if the buffering deficiency is not predicted, the cutting feed speed may be raised step by step within a range free from the buffering deficiency so that its upper limit value can be obtained and used for the processing for machining program correction. Thus, the cutting feed speed in, for example, a rough machining program can be raised, so that the machining efficiency can be improved. FIG. 6 shows a specific example of correction processing according to this modification. In an original program, instruction values of the cutting speed for a cutting block N100 are "F3000" and "F2000". In a corrected program, the instruction values are changed into "F3300" and "F2200", which are equal to 110% of the original instruction values.

Furthermore, the external computer 120 and the CNC 110 have been described as mutually independent devices according to the above-described embodiment. However, the CNC 110 may be provided with the constituent elements of the external computer 120, that is, the CNC simulator 121, machining program storage unit 122, and the like. In this case, it is conceivable that the machining program acquired from the external storage device 130 is first subjected to a virtual test run inside and the program operation is performed with the resulting optimized machining program.

Moreover, in the embodiment described above, the CNC simulator 121 transfers the optimized machining program to the external storage device 130. Alternatively, however, the CNC simulator 121 may be configured to transfer the optimized machining program directly to the CNC 110. In this case, the transfer speed control unit 123 should use, as the lower limit value of the transfer speed, that of the transfer speed between the external computer 120 and the CNC 110, not that of the transfer speed between the external storage device 130 and the CNC 110.

The invention claimed is:

1. A program optimization system comprising:
   a CNC simulator configured to sequentially read out a machining program and perform a machining simulation;
   a machining program storage unit configured to successively transfer the machining program to the CNC simulator; and
   a transfer speed control unit configured to control the speed of transfer between the machining program storage unit and the CNC simulator to be a predetermined lower limit value,
   wherein the CNC simulator is configured to
      optimize the machining program when a state of buffering deficiency in which the machining program to be read out is insufficient is detected in a cutting section and
      create optimized machining program free from a buffering deficiency, and
   wherein the CNC simulator is further configured to optimize the machining program so that (1) the buffering deficiency does not occur and (2) the machining time is the shortest, when a state of buffering deficiency occurs.

2. The program optimization system according to claim 1, wherein the CNC simulator is configured to achieve the optimization by arranging, as a subprogram, an instruction set which repeatedly appears in the cutting section.

3. The program optimization system according to claim 1, wherein the CNC simulator is configured to achieve the optimization by joining a plurality of blocks in the cutting section together.

4. The program optimization system according to claim 1, wherein the CNC simulator is configured to achieve the optimization by changing a cutting feed speed in the cutting section.

5. The program optimization system according to claim 1, further comprising
   an external computer, which comprises the CNC simulator,
the machining program storage unit, and
the transfer speed control unit,
a numerical controller configured to sequentially read out the optimized machining program and perform a program operation, and
an external storage device configured to successively transfer the optimized machining program to the numerical controller,
wherein the CNC simulator is configured to transfer the optimized machining program to the external storage device.

6. The program optimization system according to claim 1, further comprising
a numerical controller, which comprises
the CNC simulator,
the machining program storage unit, and
the transfer speed control unit, wherein
the numerical controller is configured to sequentially read out the optimized machining program and perform a program operation, and
an external storage device configured to successively transfer the optimized machining program to the numerical controller.

7. The program optimization system according to claim 1, further comprising
an external computer, which comprises
the CNC simulator,
the machining program storage unit, and
the transfer speed control unit, and
a numerical controller configured to sequentially read out the optimized machining program and perform a program operation,
wherein the CNC simulator is configured to transfer the optimized machining program to the numerical controller.

8. The program optimization system according to claim 1, wherein
the CNC simulator is configured to transfer the optimized machining program to an external storage device, and
the external storage device is configured to transfer the optimized machining program to a CNC or a numerical controller.

9. The program optimization system according to claim 8, wherein the external storage device is configured to transfer the optimized machining program to a CNC.

10. A program optimization system comprising:
a CNC simulator configured to sequentially read out a machining program and perform a machining simulation;
a machining program storage unit configured to successively transfer the machining program to the CNC simulator; and
a transfer speed control unit configured to control the speed of transfer between the machining program storage unit and the CNC simulator to be a predetermined lower limit value,
wherein the CNC simulator is configured to
optimize the machining program when a state of buffering deficiency in which the machining program to be read out is insufficient is detected in a cutting section and
create optimized machining program free from a buffering deficiency, wherein
the CNC simulator is configured to specify a changed cutting feed speed by reducing a cutting feed speed in the cutting section step by step.

* * * * *